United States Patent Office 3,344,116
Patented Sept. 26, 1967

3,344,116
PROCESS FOR THE FORMATION OF POLYPHENYLENE OXIDES
Willem F. H. Borman, Dalton, Mass., assignor to General Electric Company, a corporation of New York
No Drawing. Filed Mar. 29, 1965, Ser. No. 443,663
4 Claims. (Cl. 260—47)

ABSTRACT OF THE DISCLOSURE

A process for the formation of polyphenylene oxides by a coupling reaction performed in the presence of a halogen gas and a copper-amine complex catalyst.

---

This invention relates to a process for the preparation of polyphenylene oxides by oxidative coupling in the presence of a catalyst comprising a primary, secondary or tertiary amine-basic copper salt complex. More particularly, this invention relates to a process for the preparation of polyphenylene oxides by oxidative coupling in the presence of a catalyst comprising a primary, secondary or tertiary amine-basic copper salt complex employing a halogen gas as an oxidizing agent.

The polyphenylene oxides are described and claimed in U.S. Patent Nos. 3,306,874 and 3,306,875 of Allan S. Hay, the contents of which are incorporated herein by reference. The polyphenylene oxides have the repeating structural unit represented by the following formula:

I

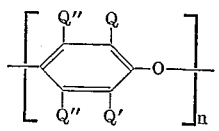

wherein the oxygen atom of one unit is connected to the phenylene nucleus of the adjoining unit, $n$ is a positive integer of at least 100, Q is a monovalent substituent selected from the group consisting of hydrogen, aliphatic hydrocarbon radicals free of a tertiary $\alpha$-carbon atom, and aliphatic halohydrocarbon radicals having at least two carbon atoms and being free of a tertiary $\alpha$-carbon atom, Q' and Q'' are both monovalent substitutents which are the same as Q and in addition, halogen, aryl hydrocarbon radicals, halo aryl hydrocarbon radicals, hydrocarbonoxy radicals having a least two carbon atoms and being free of an aliphatic tertiary $\alpha$-carbon atom, and halohydrocarbonoxy radicals having at least two carbon atoms and being free of an aliphatic, tertiary $\alpha$-carbon atom.

The method described by Hay comprises reacting oxygen in the presence of a primary, secondary or tertiary amine and a copper salt soluble in the amine and capable of existing in the cupric state with a phenol having the structural formula:

II

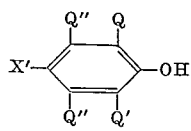

wherein X' is hydrogen, chlorine, bromine, or iodine and Q, Q' and Q'' are the same as defined above. When a primary or secondary amine is used, Q'' is hydrogen.

In the above described process of Hay, it was concluded that the reaction must necessarily be carried out in the presence of an oxygen containing gas. I have unexpectedly found that it is not necessary that the process be carried out in the presence of an oxygen containing gas, but may be carried out in the presence of halogenating gases. The advantages of my discovery are two-fold. First, I have provided an alternative procedure for the formation of polyphenylene oxides. More importantly, the resulting polymer of my invention is difunctional whereas that of Hay is not. The polymer of Hay terminates with an OH group on one end of the chain and hydrogen on the other. The polymer formed using a halogen gas as oxidizing agent has an OH group on one end and a reactive halide on the other end of the chain. Thus, the polymers of my invention may be used as building blocks in the formation of higher molecular weight polymers.

Accordingly, an object of this invention is to provide a process for the formation of polyphenylene oxides by oxidative coupling in the presence of a catalyst comprising an amine copper salt complex and a halogen gas oxidizing agent.

In many respects, the process of my invention is the same as that of Hay, except that I substitute a halogen gas for the oxygen or oxygen containing gas of Hay. By the process of my invention, I am able to produce polyphenylene oxides having molecular weights only slightly lower than those obtained by Hay and containing small amounts of halogen atoms in the polymer chain.

In providing the catalyst for my invention, I provide a source of copper which may be a cuprous or cupric salt, finely divided copper metal, cuprous or cupric oxide, etc. and an amine which may be a primary, secondary or tertiary amine.

Typical examples of the copper salts suitable for my process are cuprous chloride, cupric chloride, cuprous bromide, cupric bromide, cuprous sulfate, cupric sulfate, cuprous azide, cupric azide, cuprous tetraamine sulfate, cupric tetraamine sulfate, cuprous acetate, cupric acetate, cuprous proprionate, cupric butyrate, cuprous palmitate, cupric laurate, cuprous benzoate, cupric toluate, etc. Cuprous chloride, cupric chloride, cuprous bromide, cupric bromide, cuprous azide and cupric azide produce the highest molecular weight polymers. Although cupric sulfite is not known, cuprous sulfite can be used because it evidently is oxidized to cuprous sulfate. Copper salts such as cuprous iodide, cuprous sulfide, cupric sulfide, cuprous cyanide, cuprous thiocyanate, etc., are not suitable for use in my process, since they are either not soluble in tertiary amines or are not capable of existing as stable cupric salts. For example, cuprics cyanide and cupric thiocyanate autogeneously decompose to the corresponding cuprous salt. Cuprous nitrate and cuprous fluoride are not known to exist but the amine complexes can be made in situ.

Examples of primary and secondary amines are the aliphatic amines, including cycloaliphatic amines wherein the cycloaliphatic group is substituted on the amine nitrogen, for example, mono- and dimethylamine, mono- and diethylamine, mono- and dipropylamine, mono- and dibutylamine, mono- and disecondary propylamine, mono- and dibenzylamine, mono- and dicyclohexylamine, mono- and diethanolamine, ethylmethylamine, methylpropylamine, allylethylamine, methylcyclohexylamine, morpholine, methyl-n-butylamine, ethylisopropylamine, benzylmethylamine, octylbenzylamine, octylchlorobenzylamine, methylcyclohexylamine, methylphenethylamine, benzylethylamine, di(chlorophenethyl)-amine, 1-methylamino-2-phenylpropane, 1-methylamino-4-pentene, etc. When aliphatic amines are used, I prefer that the aliphatic groups be straight chain hydrocarbon groups.

In general, primary and secondary, mixed primary-secondary, mixed primary-tertiary or mixed secondary-tertiary polyamines would behave in the same way as primary and secondary monoamines in my reaction, except of course, the amount used would only have to be that amount necessary to give equivalent amount of amino groups. Typical examples of these aliphatic polyamines are the N,N'-dialkylethylenediamines, N,N,N'-trialkylethylenediamine, propanediamine, ethylenediamine, the N-alkylethylenediamines, the N-alkylpropanediamines, the N,N'-dialkylpropanediamines, the N,N,N'-trialkylpropanediamines, the N-alkylpropanediamines, the N,N'-dialkylbutanediamines, pentanediamine, the N-alkylpentanediamines, the N,N'-dialkylpentanediamines, the N,N,N'-trialkylpentanediamines, diethylenetriamine, the N-alkyldiethylenetriamines, the N'-alkyldiethylenetriamines, the N,N',N''-trialkyldiethylenetriamines, the N,N',N'-trialkyldiethylenetriamines, the N,N',N',N''-tetraalkyldiethylenetriamines, the N',N',N'',N''-tetraalkyldiethylenetriamines, the cyclohexylenediamines, etc. Likewise, the polyamines may be mixed aliphatic and cyclic amines, e.g., aminoalkylpyridines, alkylaminoalkylpyridines, and so forth. It has been discovered that those polyamines which have only two or three aliphatic or cycloaliphatic carbon atoms separating the two primary or secondary amino nitrogens represent a class of polyamines which are strong chelating agents and form complexes with the copper salt which so completely envelop the copper that the complex is less reactive than the other aliphatic primary or secondary amines in the oxidation of 2,6-substituted phenols. Because of this, I prefer to use primary and secondary monoamines.

Examples of cyclic, secondary amines, i.e., alicyclic amines which incorporate the amine nitrogen in the ring, are pyrrole, pyrrolidine, piperidine, imidazole, tetrahydroquinoline, tetrahydroisoquinoline, morpholine, etc., including the ring-substituted products of these cyclic amines whereby one or more of the hydrogen atoms on the carbons forming the ring are substituted by groups which may be alkyl (for example, methyl, ethyl, propyl, butyl, amyl, hexyl, heptyl, octyl, etc., and isomers and the homologues thereof), alkoxy (for example, methoxy, ethoxy, propoxy, butoxy, etc., and isomers and homologues thereof), aryl (for example, phenyl, tolyl, dimethylphenyl, chlorophenyl, bromotolyl, naphthyl, chlorobromonaphthyl, etc., and isomers and homologues thereof), aryloxy (for example, phenoxy, toloxy, xyloxy, chlorophenoxy, naphthoxy, etc., and isomers and homologues thereof), and the like. The ring substituents may be the same or different hydrocarbon groups.

Examples of tertiary amines which may be used to prepare the catalyst are the aliphatic tertiary amines, such as trimethylamine, triethylamine, tripropylamine, tributylamine, trisecondary-propylamine, diethylmethylamine, dimethylpropylamine, allyldiethylamine, dimethyl-n-butylamine, diethylisopropylamine, benzyldimethylamine, dioctylbenzylamine, dioctylchlorobenzylamine, dimethylcyclohexylamine, dimethylphenethylamine, benzylmethylethylamine, di(chlorophenethyl)bromobenzylamine, 1-dimethylamino-2-phenylpropane, 1-dimethylamine-4-phenyl pentane, etc. When aliphatic tertiary amines are used, it is preferred that at least two of the aliphatic groups be straight chain hydrocarbon groups.

In general, tertiary polyamines would behave in the same way as tertiary monoamines except, of course, the amount used would only have to be that amount necessary to give the equivalent amount of amino groups. Typical examples of aliphatic tertiary polyamines are the N,N,N',N'-tetraalkylethylenediamines, the N,N,N',N'-tetraalkylpropanediamines, the N,N,N',N'-tetraalkylbutanediamines, the N,N,N',N'-tetraalkylpentanediamines, the N,N',N'',N' - pentalkyldiethylenetriamines, etc. Likewise, the polyamines may be mixed tertiary aliphatic and tertiary aromatic amines, e.g., piperidinoalkylpyridines, dialkylaminoalkylpyridines, morpholinoalkylpyridines, and so forth. Those tertiary polyamines which have only two or three aliphatic or cycloaliphatic carbon atoms separating the two tertiary amino nitrogens represent a class of polyamines which is superior to the other aliphatic tertiary amines. For example, in the oxidation of monosubstituted phenols and phenol itself, such polyamines give catalysts of enhanced activity and allow the reaction to be run in a shorter time and/or at lower temperatures than could be used with the aliphatic tertiary monoamines. However, as in the case of the aliphatic tertiary monoamines, when oxidizing the monosubstituted phenols or phenol itself, the substituents on the amino nitrogen must be large, bulky groups if the high molecular weight polymers are the desired product.

Typical examples of these tertiary polyamines are, for example, N,N,N',N' - tetramethylethylenediamine; N-ethyl - N,N',N' - trimethylethylenediamine; N - methyl-N,N',N'-triethylethylenediamine; N,N,N',N'-tetramethyl-N,N',N'-triethylethylenediamine; N,N,N',N'-tetramethyl-1,3 - propanediamine; N,N,N',N' - tetraethylethylenediamine; N,N-dimethyl-N',N'-diethylethylenediamine; 1,2-bis(2-methylpiperidino)ethane; N,N,N',N'-tetra-n-hexylethylenediamine; N,N,N',N'-tetra-n-amylethylenediamine; 1,2-bispiperidinoethane; N,N,N',N'-tetraisobutylethylenediamine; N,N,N',N'-tetramethyl-1,3-butanediamine; 1,2-bis(2,6-dimethylpiperidino)ethane; N,N-didecyl-N',N'-dimethylethylenediamine; N - methyl-N'N,N'',N''' - tetramethyldiethylenetriamine; N - decyl-N,N',N' - triethylethylenediamine; 2-(β-piperidinoethyl) pyridine; 2-(β-dimethylaminoethyl) - 6 - methylpyridine; 2 - (β - dimethylaminoethyl)pyridine; and 2-(β-morpholinoethyl)pyridine; etc.

Examples of cyclic amines are the pyridines, such as pyridine itself, quinuclidine, the dipyridyls, the N-alkyl pyrroles, the N-alkyl pyrrolidines, the N-alkyl piperidines, the N-alkyl diazoles, the N-alkyl triazoles, the diazines, the triazines, the quinolines, the diquinoyls, the isoquinolines, the N-alkyl tetrahydroquinolines, the N-alkyl tetrahydroisoquinolines, the phenanthrolines, the N-alkyl morpholines, etc., including the ring-substituted products of these cyclic amines whereby one or more of the hydrogen atoms on the carbons forming the ring are substituted by groups which may be alkyl (for example, methyl, ethyl, propyl, butyl, amyl, hexyl, heptyl, octyl, etc., and isomers and the homologues thereof), alkoxy (for example, methoxy, ethoxy, propoxy, butoxy, etc., and isomers and homologues thereof), aryl (for example, phenyl, tolyl, dimethylphenyl, chlorophenyl, bromotolyl, naphthyl, chlorobromonaphthyl, etc., and isomers and homologues thereof), aryloxy (for example, phenoxy, toloxy, xyloxy, chlorophenoxy, naphthoxy, etc., and isomers and homologues thereof), and the like. The ring substituents may be the same or different hydrocarbon groups. It is understood that when piperidines, pyrroles, pyrrolidines, diazoles, tetrahydroquinolines, tetrahydroisoquinolines, etc., are used they are tertiary amines whereby an alkyl hydrocarbon radical, such as those listed above for the ring substituents, is also attached to the amine nitrogen group, e.g., N-methylpyrrole, N-methyl tetrahydroquinoline, N - methyl tetrahydroisoquinoline, N-methyl piperidine, N-methyl pyrrolidine, N-methylimidazole, N-methyl-1,2,4-triazole, N-decylpiperidine, N-decylpyrrolidine, N-isobutylpiperidine, 1-decyl-2-methylpiperidine, N-isopropylpyrrolidine, N-cyclohexylpiperidine, etc.

The preferred group of phenols for preparing the polyphenylene ether starting materials are o-cresol, the 2-halo-6-methylphenols, e.g., 2-chloro-6-methylphenol, 2-bromo-6-methylphenol, etc., and 2,6-xylenol. However, other phenols having hydrocarbon, halohydrocarbon, hydrocarbonoxy, or halohydrocarbonoxy groups in one ortho position and a methyl group in the second ortho position may also be used, including those also having an aryloxy substituent in the para position. Examples of such phenols are: 2-ethyl-6-methylphenol, 2-propyl-6-methylphenol, the 2-butyl-6-methylphenols, the 2-pentyl-6-methylphenols, 2-cyclohexyl-6-methylphenol, 2-phenyl-6-methylphenol, 2-tolyl-6-methylphenol, 2-benzyl-6-methylphenol, 2-methoxy-6-methylphenol, 2 - ethoxy - 6 - methylphenol, 2-phenoxy-6-methylphenol, the 2-(chloroethyl)-6-methylphenols, the 2 - (chlorophenyl) - 6 - methylphenols, the 2 - (bromopropoxy) - 6 - methylphenols, the 2-(iodophenoxy)-6-methylphenols, the 2(difluoroethyl)-6-methylphenols, 2,6-dimethyl-4-(2',6'-dimethylphenoxy)-phenol, 2,6-dimethyl-4-(2'-methylphenoxy)phenol, etc.

In preparing the catalyst system, mixtures of amines and mixtures of copper salts may be used, but no benefit would accrue from such use over the catalyst prepared using only a single amine and a single copper salt. Preferably, the copper salt is dissolved in the amine before the phenol reactant is added. In some cases, dissolving of the cuprous salt may be hastened by heating the mixture by bubbling in air or oxygen, or a combination thereof. In order to effectively use all of the copper, enough amine should be added to complex and thereby dissolve all the added cuprous salt. Larger excesses of amine do not adversely affect the reaction, and in some cases may be desirable in order to completely dissolve all of the phenol reactant and to act as a solvent for the reaction product. Other solvents such as alcohols, ketones, hydrocarbons, chlorohydrocarbons, nitrohydrocarbons, ethers, esters, amides, mixed ether esters, sulfoxides, etc. may be present in the reaction system, providing they do not interfere or enter into the oxidation reaction.

In the above-referenced Hay Patents, oxygen or oxygen containing gases bubbled into the reaction mixture cause an exothermic reaction with the formation of water as a by-product. In the process of my invention, a holgenating gas such as chlorine or bromine is bubbled through the reaction mixture instead of oxygen. I have found that fluorine is not suitable for the process of my invention.

It is necessary to provide an absorbent for acid formed during the reaction as a build-up of excess acid will deactivate the copper-amine catalyst. Thus, I can add a base to neutralize the acid—i.e., an alkali hydroxide such as calcium hydroxide, sodium hydroxide, potassium hydroxide, etc. Alternatively, the acid is removed with an ion exchange resin such as Dowex 1, a strongly basic anion exchanger manufactured by Dow Chemical Co.

The amount of halogenating material passed through the reaction vessel is that amount necessary to complete the reaction. I have found that only the required amount of halogen should be passed through the reaction vessel to prevent further halogenation of the reaction product.

At the completion of the reaction, the polymer formed may be collected in the manner defined by Hay in the above-referenced patents. That is, the product can be removed from the presence of the catalyst either by filtering off the product if it has precipitated, or by pouring the reaction mixture into a material which is a solvent for the catalyst system but a non-solvent for the product. Alternatively, I may precipitate the copper as an insoluble compound and filter it from the solution prior to isolating the product or I may add a chelating agent which inactivates the copper. After the product is precipitated, it may be redissolved and reprecipitated any desirable number of times to remove impurities.

Although it would be expected that the product resulting from my reaction would contain a large number of halogen atoms substituted on the polymer chain, I have found that this not the case. The only evidence of halogen substitution is found on the last repeating unit of the polymer chain in the para or four position rendering the polymer difunctional.

In order that those skilled in the art may better understand my invention, the following examples are given which are illustrative of the practice of my invention, and are not intended for purpose of limitation. In the examples, all parts are by weight unless otherwise stated.

*Example 1*

In this example, 12 g. of 2,6-dimethylphenol (0.1 g. mol) were dissolved in 100 ml. of chloroform in a 3-neck flask equipped with a sealed stirrer, a reflux condenser, a separatory funnel and a nitrogen inlet to purge the system. Thereafter, 25 ml. of tetramethyl-1,3-butanediamine (approximately 0.3 g. equivalents) and 0.1 g. of cuprous chloride were added and the flask cooled in an ice water bath.

In a separate vessel, 16 g. of bromine (0.1 g. mol) were dissolved in 50 ml. of chloroform. This solution of bromine was slowly added to the reaction mixture over a period of approximately twenty minutes. Stirring was contained for approximately ten minutes after all of the bromine solution was added. Subsequently, the solution was poured into excess methanol to precipitate the polymer and acidified with 38 percent hydrochloric acid. The precipitate was filtered off, washed with methanol and redissolved in chloroform to remove impurities. Thereafter, the polymer was reprecipitated with methanol and filtered. The polymer was placed in a circulating air desiccator to dry the polymer and left overnight. The yield was 6 g.

*Example 2*

In this example, the procedure used in Example 1 was repeated. Fifteen grams of 2-methyl-6-isopropylphenol (0.1 mol) were dissolved in 100 ml. of chloroform in a 3-neck flask equipped with the sealed stirrer, reflux condenser and separatory funnel of Example 1. Then, 25 ml. of tetra-methyl-1,3-butanediamine and 0.1 g. of cuprous chloride in chloroform were added to the vessel. The solution was again cooled in an ice water bath. Again, 0.1 g. mols of bromine were dissolved in 50 ml. of chloroform and slowly added to the reaction mixture over a period of approximately twenty minutes. The polymer was precipitated by pouring the solution into methanol acidified with 38 percent hydrochloric acid. The polymer was filtered off and washed with methanol and again reprecipitated from chloroform solution with methanol. The yield of the resulting polymer was 9 g. and the polymer had an intrinsic viscosity as measured in chloroform at 30° C. of 0.05 dl./g. The bromine content was found to be less than 0.3 meq./g.

*Example 3*

In this example, 30 g. of 2,6-dimethylphenol were dissolved in 500 ml. of chloroform containing 100 g. of N,N,N',N'-tetramethyl-1,3-butanediamine in a reaction flask. The flask was purged with nitrogen gas throughout the experiment. Then, 0.25 g. of cuprous chloride were added to the reaction mixture and 65 g. of iodine were thereafter added to the reaction mixture in small portions.

After all of the ingredients had been added, stirring was continued for one hour. At the end of the hour, the reaction mixture was added to an excess of methanol and acidified with concentrated hydrochloric acid. The precipitated polymer product formed was filtered off, washed with methanol, redissolved in chloroform, and reprecipitated from chloroform with methanol. After drying, the product yield was found to be 23.6 g. The product had an intrinsic viscosity in chloroform at 30° C. of 0.1 dl./g. and contained $0.091 \times 10^{-3}$ equivalents of iodine per gram.

*Example 4*

In this example, 30 g. of 2,6-dimethylphenol were dissolved in 500 ml. of chloroform and the flask was cooled in an ice bath. Thereafter, 100 g. of N,N,N',N'-tetramethyl-1,3-butanediamine and 1 g. of cuprous chloride were added to the solution. Chlorine gas was then bubbled through the mixture for a period of 55 minutes to introduce a total of 19.8 g. of chlorine gas to the solution. Stirring of the mixture was maintained for one hour, after which, the reaction mixture was added to an excess of methanol and acidified with concentrated hydrochloric acid. The product formed was filtered from the solution, washed with methanol, redissolved in chloroform and reprecipitated with methanol. The polymer yield was found to be 7 g. and had intrinsic viscosity as measured in chloroform at 30° C. of 0.1 dl./g. The chlorine content of the product, as measured by silver nitrate titration, was $0.65 \times 10^{-3}$ equivalents of chlorine per gram.

Obviously, other modifications and variations of the present invention are possible in light of the above teaching. It is, therefore, to be understood that changes may be made in the particular embodiments of the invention described which are within the full intent and scope of the invention as defined by the appended claims.

What I claim as new and desire to secure by Letters Patent of the United States is:

1. A process for forming self condensation products of phenols having the structural formula:

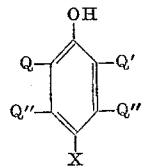

wherein Q is a monovalent substituent selected from the group consisting of hydrogen, hydrocarbon radicals, halohydrocarbon radicals having at least two carbon atoms between the halogen atom and phenol nucleus, hydrocarbonoxy radicals and halohydrocarbonoxy radicals having at least two carbon atoms between the halogen atom and phenol nucleus, Q' and Q" are the same as Q and in addition, halogen, and X is a member selected from the group consisting of hydrogen and a halogen which comprises reacting the phenol with a halogen in the presence of a catalyst comprising a solution of a primary, secondary or tertiary amine, basic cupric salt complex in which the said phenol is soluble.

2. The process of claim 1 wherein Q and Q' are methyl, and Q" and X are hydrogen.

3. The process of claim 1 wherein the halogen with which the phenol is reacted is chlorine.

4. The process of claim 1 wherein the halogen with which the phenol is reacted is bromine.

References Cited

FOREIGN PATENTS 930,993    7/1963    Britain.

OTHER REFERENCES

Staffin et al., J. Am. Chem. Soc., 82, 3632 (1960).

WILLIAM H. SHORT, *Primary Examiner.*

M. GOLDSTEIN, *Assistant Examiner.*